(12) United States Patent
Edelman et al.

(10) Patent No.: US 6,749,726 B2
(45) Date of Patent: Jun. 15, 2004

(54) APPARATUS AND METHOD FOR INITIATING A COMBUSTION REACTION WITH SLURRY FUEL

(75) Inventors: Raymond Bernard Edelman, Woodland Hills, CA (US); Jeffrey H. Hunt, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 10/007,994

(22) Filed: Nov. 8, 2001

(65) Prior Publication Data

US 2003/0085112 A1 May 8, 2003

(51) Int. Cl.[7] .................................................. C07C 4/02

(52) U.S. Cl. ............................................... 204/157.15

(58) Field of Search ................................... 204/157.15

(56) References Cited

U.S. PATENT DOCUMENTS

| | | | | |
|---|---|---|---|---|
| 3,258,910 A | | 7/1966 | Seymour | 60/35.6 |
| 3,296,795 A | | 1/1967 | Nielsen | 60/39.82 |
| 3,300,968 A | | 1/1967 | Fullman | 60/39.82 |
| 4,047,483 A | | 9/1977 | Williams | 102/70.2 A |
| 5,220,783 A | | 6/1993 | Cherry et al. | 60/204 |
| 5,374,405 A | * | 12/1994 | Firnberg et al. | 422/186.3 |
| 5,397,869 A | | 3/1995 | Huen | 200/330 |
| 5,404,712 A | | 4/1995 | Few et al. | 60/39.821 |
| 5,845,480 A | | 12/1998 | DeFreitas et al. | 60/39.06 |

FOREIGN PATENT DOCUMENTS

EP      0 631 049 A2      12/1994

OTHER PUBLICATIONS

Zhang, "Laser–Induced Ignition of Pulverized Fuel Particles", Combustion and Flame, vol. 90 (no month, 1992), pp. 134–142.*
Andrzej W. Miziolek and Rosario C. Sausa, Technical Report BRL–TR–2644, Photochemical Ignition Studies, I. Laser Ignition of Flowing Premixed Gases; Feb. 1985, pp. 1–29 (pp. 4, 6 and 20 are blank in original).
P. Antaki and F. A. Williams, Combustion and Flame 67, Observations on the Combustion of Boron Slurry Droplets in Air, 1997, pp. 1–8, no month.
Brad E. Forch, Resonant Laser Ignition of Rective Gases, Aug. 1994, pp. 118–128.
Brad E. Fsrch and Andrzej W. Miziolek, Ultraviolet Laser Ignition of Premixed Gases by Efficient and Resonant Multiphoton Photochemcial Formation of Microplasmas, Jun. 10, 1986, 5 pages.
A. McIlroy, T. A. Spiglanin, R. B. Cohen and J. A. Syage, Time–Resolved, Planar Laser Induced Fluorescence Studies of Laser Ignition, Jun. 20–23, 1994, 6 pages.

* cited by examiner

Primary Examiner—Edna Wong
(74) Attorney, Agent, or Firm—Harness Dickey & Pierce P.L.C.

(57) ABSTRACT

A method and apparatus for initiating a combustive reaction in a slurry fuel. A transfer device optically interconnects an optical energy source with a combustion chamber containing slurry fuel and air. The optical energy source generates an output for interacting with the slurry fuel and air mixture to create a combustive reaction. In a first preferred embodiment, the optical energy source generates an excitation pulse having a high power leading edge and low power trailing edge. In a second preferred embodiment the optical energy source generates a first and second excitation pulse, the first excitation pulse having higher power than the second excitation pulse.

13 Claims, 3 Drawing Sheets

APPARATUS AND METHOD FOR INITIATING A COMBUSTION REACTION WITH SLURRY FUEL

FIELD OF THE INVENTION

The present invention relates to fuel ignition and, more specifically, to optically initiated chemical reactions to establish combustion in a propulsion engine using storable high-density slurry fuels.

BACKGROUND OF THE INVENTION

Slurry fuels are propulsion fuels containing small metal particulates, which increase the density and energy of the fuel and also increase the specific impulse and thrust potential from the fuel. The metal particles, however, make initiation more difficult using traditional electric-spark or torch-ignition techniques.

SUMMARY OF THE INVENTION

The present invention provides a method and device to initiate a combustion reaction with a slurry fuel. The method includes the steps of providing an optical energy source; providing a storage chamber containing slurry fuel; providing a delivery device for optically interconnecting the optical energy source with the storage chamber; generating an output from the optical energy source; and transporting the output through the delivery device to interact with the slurry fuel to create a combustive reaction.

The present invention also provides a device for optically initiating a combustion reaction between a slurry fuel and air. The device includes an optical energy source and a combustion chamber containing fluid therewithin. A transfer device optically interconnects the optical energy source with the combustion chamber. The optical energy source generates an output for interacting with the slurry fuel and air mixture to create a combustive reaction therewith.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
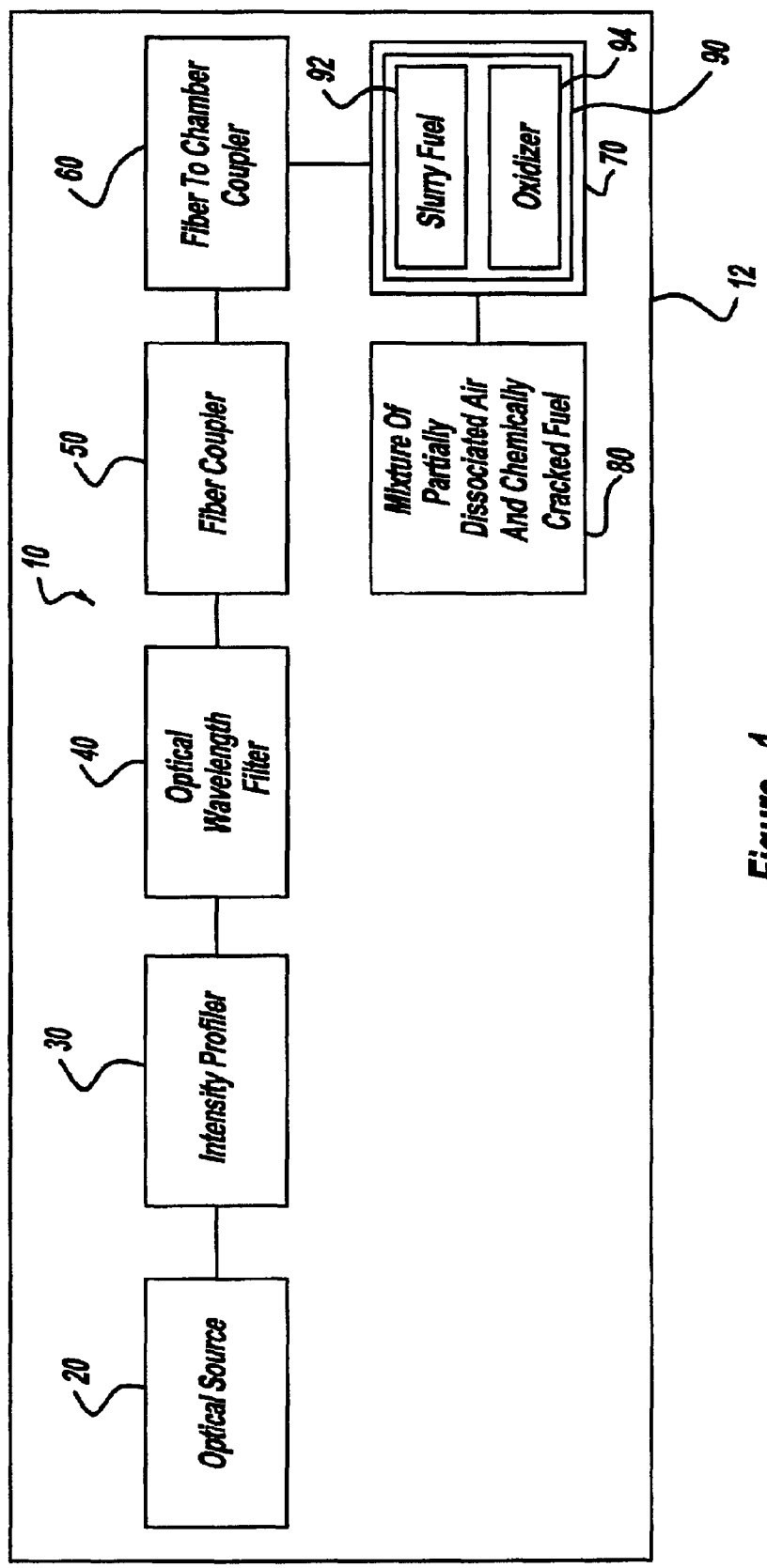
FIG. 1 is a block diagram of the optically initiated propulsion system of the present invention.

With initial reference to FIG. 1, the optically initiated propulsion system according to the present invention is illustrated and generally identified at reference 10. The propulsion system 10, shown operatively disposed in vessel 12, includes an optical source 20 such as a laser for producing laser light. Fiber coupler 50 optically connects optical source 20 with a slurry fuel/oxidizer mixture 90 in combustion chamber 70. An intensity profiler 30 and optical wavelength filter 40 are incorporated between optical source 20 and fiber coupler 50. A fiber to chamber coupler 60 is used to interconnect the fiber coupler 50 with the slurry fuel/oxidizer mixture 90. The optical initiation of combustion of the slurry fuel and air mixture yields a mixture of partially dissociated air and chemically cracked fuel 80.

It can be appreciated by those skilled in the art that fiber coupler 50 may alternatively be a collection or series of fiber couplers in a bundle. Likewise, the fiber couplers 50 may interconnect with multiple combustion chambers 70 within the vessel 12.

The characteristics of laser light emitted from the optical source 20 will now be described in greater detail. Characteristics associated with laser light must be optimized for optically initiating combustion. In the case of a slurry fuel, additional constraints need to be imposed. The laser light wavelength must be short enough so that absorption via linear or nonlinear mechanisms leads to molecular dissociation of fuel, oxidizer or both. The implication is that the light must be in the ultraviolet range of the spectrum, preferably shorter than 300 nanometers. In most practical applications, a diode-pumped solid state laser will be used as optical source 20 because of its mechanical robustness. The light from these lasers, however, will typically be in the near infrared, requiring nonlinear optical conversion to shorter wavelengths. After the conversion is accomplished, there will be remnants of longer wavelengths in the laser light. Before introduction into the fiber coupler 50, optical wavelength filter 40 or equivalent filtering medium removes any residual light at longer wavelengths.

For to occur in a slurry fuel 92, a balance must be reached between the light energy absorbed into the fuel/oxidizer mixture and the volume of the mixture that is excited. In other words, the absorbed energy density of the mixture is as important as the absorbed energy itself. If too much energy is deposited in a highly localized volume of slurry fuel 92, it will not be sufficient to allow the exothermic chemical reaction to reach a self-initiating condition. In non-slurry fuels, there is no localized field enhancement, so tailoring the intensity is not necessary. For slurry fuels, it becomes very important. Because the interaction with the slurry fuel/oxidizer mixture 90 will begin with a nonlinear optical absorption, the light emitted from optical source 20 is preferably in a pulsed format so that high peak laser powers can be generated. In this manner, sufficient energy in each pulse generates a peak power on the order of approximately 1–2 Megawatt, this being the peak power generally associated with the onset of nonlinear optical behavior. In addition, the pulse shape and/or format is designed for optimized interaction with metal particulates within the fuel, which leads to local enhancement of the electric field associated with the light emitted from optical source 20. Consequently, any nonlinear optical process begins at one of these metal particulates. Also, because the ignition process will initiate near the metal particles and because these particles are optically opaque, they will absorb a higher percentage of the laser light, disproportionately to the surrounding media. In doing so, they will aid in coupling the optical energy into internal energy and consequent heating of the fuel/oxidizer mixture. The dissociation of the molecules is associated with light wavelengths in the ultraviolet shorter than 300 nm. The internal heating of molecules is associated with light wavelengths in the infrared, longer than 900 nm. The presence of the metal particles creates a situation of where molecular dissociation and molecular heating processes are simultaneously enhanced. For this reason, the intensity of the laser light is profiled to have a high peak power at the initiation of ignition, when molecular dissociation dominates the physical process, and lower after ignition initiation, when internal heating dominates the process.

Figure 3:
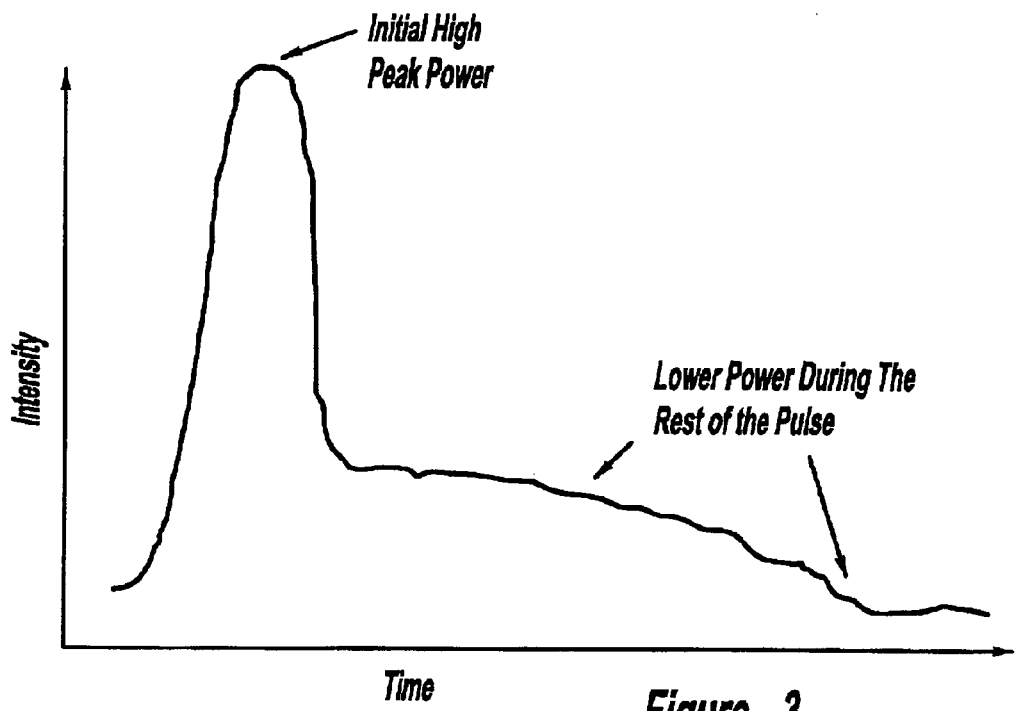
FIG. 3 is a graphical representation of a light pulse over time according to the first preferred embodiment.
Figure 4:
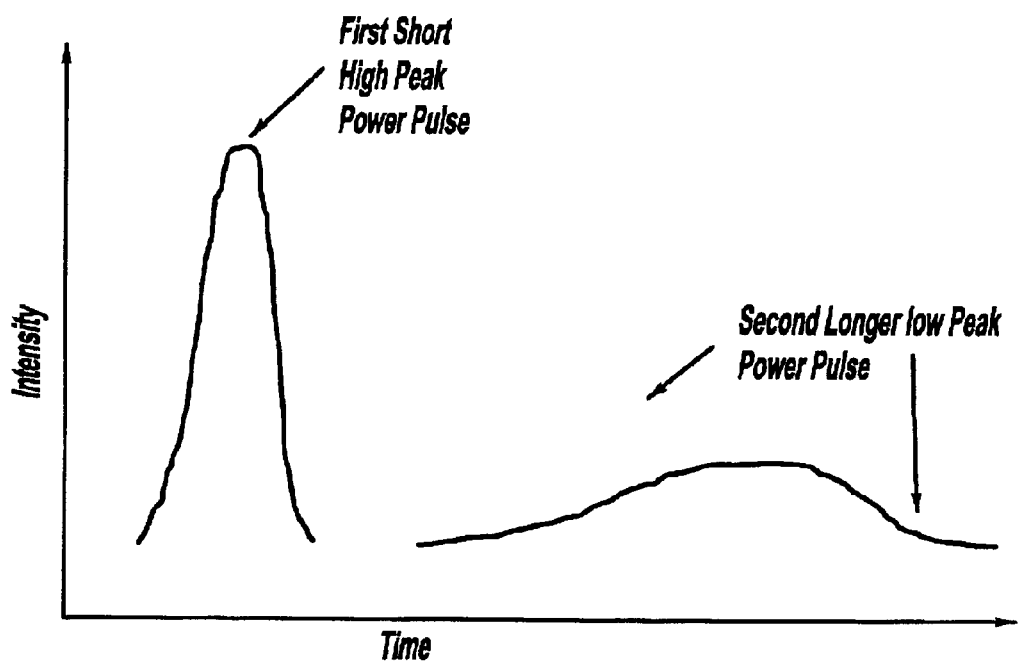
FIG. 4 is a graphical representation of a first and second light pulse over time according to the second preferred embodiment.

Intensity profiler 30 will now be described in greater detail. It will be appreciated by those skilled in the art that the location of intensity profiler 30 is merely exemplary and may be positioned subsequent to optical wavelength filter 40. The present invention incorporates a first and second preferred embodiment for igniting slurry fuel 92. The first embodiment, as shown in FIG. 3, incorporates an optical source 20 that creates an excitation pulse having a high initial peak power at its leading edge, and a lower peak power during the remainder of the pulse. In the second embodiment, shown in FIG. 4, two or more pulses are generated. The first pulse has a high peak power and the second and subsequent pulses have a lower peak power. The first and subsequent pulses are injected in a temporally serial fashion. This pulsing sequence can be used one time in an engine with steady flow. It can also be used multiple times, as in a pulsed detonation wave engine, and further be programmed to create a desired sequence of ignitions.

In each embodiment, the high peak power will generate a micro-plasma quickly. This plasma is opaque to almost all laser wavelengths. The time elapsed between the high and low power excitations must be short enough, preferably less than ten nanoseconds, but possibly as long as 100 nanoseconds, such that all the energy of the lower peak power will be uniformly absorbed without causing other undesirable nonlinear optical processes to interfere with the optical initiation. It should be noted that this timing applies to any engine, regardless of the flow velocities of the fuel/oxidizer mixture. Even in hypersonic engines, the flow would be at a virtual standstill during the 10–100 nanosecond timeframes described.

The slurry fuel 92 used in the combustion process will now be described. Slurry fuel in general can be made from a mixture of pulverized coal and water or a metal powder in a liquid hydrocarbon fuel. For example, slurry fuel 92 approximately consists of 50–70 percent particulates, 28–49 percent carrier liquid and 1 to 2 percent chemical additives to disperse the particulates in the liquid and prevent natural settling of the solids. The precise percentage of slurry fuel ingredients, however, may vary. The particulate matter is typically on the order of 1 to 10 microns in size. The ignition of the slurry fuel/oxidizer mixture 90 using optical source 20 will now be described in greater detail. The equation governing the optical intensity to drive the optical breakdown is given by:

$$I_{cr} = \{mcE_I(1+(\omega\tau)^2)\}/[2\pi e^2\tau]\}[g+1/\tau_\rho \log_e(\rho_{cr}/\rho_0)]$$

Where $\rho_{cr}$ is the critical electron number for breakdown, $\tau_\rho$ is the laser pulsewidth; m, e, c are the electron constants; $\omega$ is the optical field frequency; $E_1$ is the ionization energy of the fuel or oxidizer; $\tau$ is the momentum transfer collision time; g is the electron loss rate; and $\rho_0$ is the "initial" electron density. Although this depends on the particular characteristics of the medium, optical systems can be designed which can deliver this level of intensity into the combustion chamber 70.

Once a finite number of slurry fuel 92 and/or oxidizer 94 molecules have been dissociated, the resulting physical state is an optically opaque medium. All the subsequent energy in the laser pulse is absorbed into the medium. The optical spot size is a function of the intensity at which the fuel oxidizer molecules break down. Requirements for breakdown generally are easier in slurry fuel 92 because the presence of metal particles will both increase optical absorption and enhance the optical nonlinearity of the media. Peak powers of approximately 1–2 Megawatts at ultraviolet wavelengths, preferably less than 300 nanometers, will be sufficient to initiate breakdown, with the first breakdowns occurring near the metal particles. Internal energies sufficient to drive the mixture into a self-initiating condition can then be realized with a lower power portion of the same pulse according to the first embodiment or with a second laser pulse according to the second embodiment to complete the initiation of the reaction.

Optical delivery systems can apply energies on the order of 10 millijoules to a fuel system. Fiber coupler 50 transmits pulses which are simultaneously high peak power and short wavelength, and is preferably non-solarizing optical fiber that supports high peak power and short wavelength requirements and transmits the pulse without loss of energy or intensity. The absorption volume in the fuel slurry 92 is in the order of 106 cubic microns. A corresponding energy density of 10 GJ/cubic meter is produced to initiate combustion. Through the use of non-linear absorption, enough free electrons are created within the high intensity focus region to allow the mixture to take on the absorption characteristic of plasma. Plasma ranges from highly absorbing to completely opaque and allow for a finite fraction of the pulse energy to be absorbed by the medium. In addition, metal particulates included in the slurry fuel 92 enhance the optical nonlinearity of the media. Specifically, the metal particulates which enhance the propulsion properties of the fuel also create local regions of electric field enhancement, allowing plasma formation to initiate at laser powers much lower than typically required for optical initiation. The resulting mixture 80 after ignition will be comprised of partially dissociated air and chemically cracked fuel. The mixture includes molecular and atomic oxygen, an array of hydrocarbon fragments, low molecular weight hydrocarbon compounds and some remaining parent carrier fuel.

Figure 2:
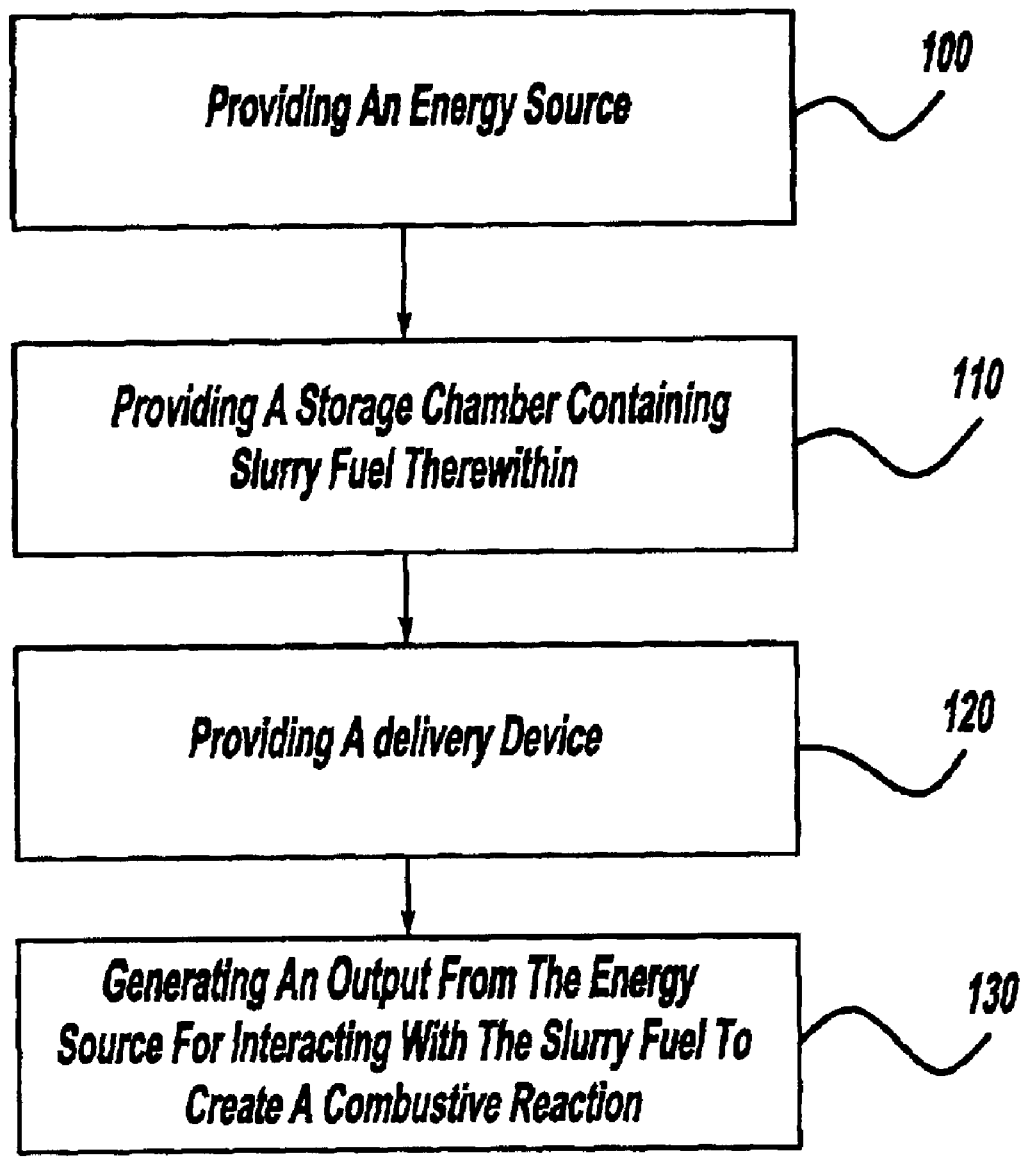
FIG. 2 is a graphical representation of the method of optical ignition according to the present invention.

Turning now to FIG. 2, in a first general step 100 the preferred method of the present invention provides an energy source 20. In a second general step 110, a combustion chamber 70 containing a slurry fuel/oxidizer mixture 90 is provided. In a third general step 120, a delivery device 50 is provided. In a fourth general step 130, an output is generated from the energy source 20 for interacting with the slurry fuel/oxidizer mixture 90 to create a combustive reaction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method to initiate a combustive reaction with a slurry fuel, said method comprising the steps of:
   providing an optical energy source;
   providing a combustion chamber, said combustion chamber containing slurry fuel therewithin;
   interconnecting a delivery device with said optical energy source and said combustion chamber;
   generating a pulsed output from said optical energy source;
   modifying said pulsed output to have a high power portion adapted to initiate an ignition phase of said slurry fuel and a low power portion adapted to maintain a combustive reaction of said slurry fuel after said slurry fuel is initially ignited;

transporting said pulsed output through said delivery device; and interacting said pulsed output with said slurry fuel to ignite said slurry fuel using said high power portion of said pulsed output and maintain said combustive reaction using said low power portion of said pulsed output.

2. The method according to claim 1, wherein the step of modifying said pulsed output includes the step of modifying an excitation pulse output from said optical energy source, said excitation pulse having a leading edge included in said high power portion and a trailing edge included in said low power portion.

3. The method according to claim 1, wherein the step of modifying said pulsed output includes the step of modifying a first pulse output from said optical energy source to have a peak power included in said high power portion and modifying a plurality of subsequent second pulses to have peak powers included in said low power portion.

4. The method according to claim 3, wherein said first pulse is injected a predetermined time prior to said second pulses.

5. The method according to claim 4, wherein said predetermined time is less than ten (10) nanoseconds.

6. The method according to claim 1, wherein said optical energy source includes a laser.

7. The method according to claim 1, wherein said delivery device includes a non-solarizing fiber optic.

8. The method according to claim 7, wherein said fiber optic includes a fiber optic bundle.

9. The method according to claim 1, wherein said high power portion has a peak power value greater than one (1) Megawatt.

10. The method according to claim 1, wherein said output includes light.

11. The method according to claim 10, wherein said light includes a laser beam.

12. The method according to claim 10, wherein said light comprises wavelengths less than 300 nanometers.

13. The method according to claim 1, wherein said combustive reaction yields dissociated air and a chemically cracked fuel.

* * * * *